US006804719B1

United States Patent
Cabrera et al.

(10) Patent No.: US 6,804,719 B1
(45) Date of Patent: Oct. 12, 2004

(54) METHOD AND SYSTEM FOR RELOCATING FILES THAT ARE PARTIALLY STORED IN REMOTE STORAGE

(75) Inventors: Luis Felipe Cabrera, Bellevue, WA (US); Deborah C. Jones, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 680 days.

(21) Appl. No.: 09/645,861

(22) Filed: Aug. 24, 2000

(51) Int. Cl.[7] .............................................. G06F 13/00
(52) U.S. Cl. ..................... 709/226; 709/217; 707/10; 707/104
(58) Field of Search ................................ 709/213, 217, 709/219, 223, 224, 226, 203, 328; 719/328; 707/10, 104, 200

(56) References Cited

U.S. PATENT DOCUMENTS

| | | | | |
|---|---|---|---|---|
| 6,119,118 A | * | 9/2000 | Kain et al. ..................... | 707/10 |
| 6,330,572 B1 | * | 12/2001 | Sitka ........................... | 707/205 |
| 6,393,435 B1 | * | 5/2002 | Gartner et al. ............... | 707/200 |
| 6,449,615 B1 | * | 9/2002 | Liu et al. ...................... | 707/10 |
| 6,553,391 B1 | * | 4/2003 | Goldring et al. ............ | 707/203 |
| 6,681,310 B1 | | 1/2004 | Cabrera et al. | |

* cited by examiner

*Primary Examiner*—Viet D. Vu
(74) *Attorney, Agent, or Firm*—Woodcock Washburn LLP (57) ABSTRACT

An improved hierarchical storage management (HSM) system used in connection with computer systems is provided. A technique is provided whereby a file having portion(s) migrated to remote storage location(s) may be efficiently relocated, and metadata for the file is updated according to its relocated storage relationships. Thus, when a source file having portions migrated to remote storage is to be re-located or copied by the HSM system to a target file, instead of copying the entire file across all of its associated storage locations, the minimum or efficient set of data is relocated. The metadata describing the source file's migration storage characteristics is updated to reflect its new use in connection with the target file.

9 Claims, 8 Drawing Sheets

METHOD AND SYSTEM FOR RELOCATING FILES THAT ARE PARTIALLY STORED IN REMOTE STORAGE

BACKGROUND OF THE INVENTION

1. Field of the Invention

The present invention relates to storage operations and management in a computer system. More particularly, the present invention relates to a method and system for relocating files that are partially stored in remote storage.

2. Brief Description of Related Developments

Since its advent, the model of a standalone personal computer with removable storage media has had a great effect on the computer industry and influenced the design of much of computer system architectures and infrastructures. However, advances in storage solutions and complex computer systems have been happening rapidly since the time of the first standalone computers. For example, continued discovery of smaller and smaller integrated circuits and semiconductor chips capable of storing ever increasing quantities of data, increased bandwidth and data transfer rates possible with today's computer networks and the concomitant increased utilization of server computers in connection with databases and storage components of all types are all examples of the increased functionality that networked computer environments have evolved to possess.

As a consequence, traditional computing and storage techniques and models have been challenged. The widespread use of removable storage media, for example, has been challenged by the ability to remotely store files efficiently and inexpensively. Furthermore, as computer systems have evolved, so has the availability and configuration of data storage devices, such as magnetic or optical disks. For example, these storage devices can be connected to the computer system via a bus, or they can be connected to the computer system via a wired or wireless network. In addition, the storage devices can be separate or co-located in a single cabinet.

As background, a storage volume is a software abstraction of the underlying storage devices and is the smallest self-contained unit of storage mounted by an operating system and administered by the file system. Storage volumes abstract the physical topology of their associated storage devices and may be a fraction of a disk, a whole disk or even multiple disks that are bound into a virtually contiguous range of logical blocks. This binding may increase the fault tolerance, performance, or capacity characteristics of the underlying devices. In short, in today's complex computer system environments, storage volumes can be a diverse set of elements for which efficient and effective management is desirable.

Volumes are constructed from one or more extents that are contiguous storage address spaces presented by the underlying storage devices. An extent is typically characterized by the size of the address space and a starting offset for the address space from a base of the media. Volume mapping is the process of mapping contiguous address space presented by the volume onto the non-contiguous storage address spaces of the underlying extents. Volume mappings are either implemented on a specialized hardware controller, referred to as a hardware volume provider, or in software by a software volume provider. By way of further background, a technique for common administration and management of volume providers is provided in commonly assigned application Ser. No. 09/449,577, entitled "Administration of RAID Storage Volumes" now U.S. Pat. No. 6,081,310.

Advances in storage techniques are changing the ways in which data can be stored, thereby placing a strain on the traditional management of files within and between volumes. Thus, advances in networks and computer system models have greater ramifications than simply resulting change in the types of storage components being utilized and in the connections being used between the storage components. Techniques traditionally used to manage file transfers, for example, were not originally designed to support all of the increased functionality of today's complex networked environments. Operating systems, system infrastructure and core file management functions with which many computers operate have thus been affected. As a consequence, current file systems have lingering inefficiency associated therewith and are not equipped to handle all different types of storage operations with maximum efficiency.

One such inefficiency exists in connection with the hierarchical storage management (HSM) system, the system that oversees the storage of files and operations incident thereto. With the proliferation of various storage elements and techniques as described above, sometimes it becomes desirable to store portion(s) of a file in remote storage while retaining portion(s) in local storage. This may be desirable, for example, to free up more valuable local storage when portions of a file are known to be static, or to stow away certain data that is infrequently utilized. For another example, an append only file has the characteristic that data writes occur only at the end of the file. For yet another example, migration of data to remote storage might be an effective way of providing on-line disk/memory allocation limits. Consequently, an efficient use of local storage may dictate that the immutable portions of the file, to which new writes are appended, be migrated to remote storage. Thus, there are a variety of reasons why a file may have some data that is suited to migration to remote storage.

The case for partial migration of files is not generally supported in current HSM systems for relocation operations and the like. For example, a file copied from one storage location to another storage location, such as from on-line storage to remote storage, generally involves copying or moving the entire file. Current HSM systems perform a file move by recalling the entire file, copying it either to a second server managed by a second HSM system or to a second volume managed by the same HSM system, and registering the target volume for administration by either the second or same HSM system, respectively. Thus, current HSM systems do not perform move operations without changing on-disk allocations.

Commonly assigned copending U.S. patent application Ser. No. 09/644,667 entitled "Partial Migration of an Object to Another Storage Location in a Computer System," filed on the same day as the present application, relates to a HSM system that does support partial migration of data streams/files. In that system, metadata is generated for the description of a file having at least one portion migrated. Via the metadata, the HSM system can recall the file data since the metadata contains information relating to where each portion of the file is stored. A need still exists, however, for efficient relocation techniques in connection with such a system. A system could be implemented for a file or other data stream, stored partially in a base storage location and stored partially in another storage location as a result of partial migration techniques, such that the HSM system, used incident to the file migration, would cause relocation of the entire file, i.e., both the portion remotely stored and the portion stored on the base volume. For example, the HSM system could cause the remotely stored or migrated portion to be read back from remote storage and then the entire file once re-assembled in the base volume could be relocated according to standard relocation techniques.

Thus, the current state of the art of hierarchical storage management of files inadequately or inefficiently covers the case where files, to be copied, moved or re-located in some respect, have been partially migrated to another storage location. Further, the state of the art provides inadequate and/or inefficient support for systems administering the migration of predetermined part(s) of files/streams from one storage location to another while retaining other part(s) of files/streams. The invention of U.S. application Ser. No. 09/644,667 referenced above, describes a mechanism for specifying those regions of a data stream suited to writes and updates and those immutable or other regions of a data stream suited to off-line or remote storage. In so doing, a method of generating metadata for describing a stream's storage relationships is provided. However, a need still exists for updating the metadata in the event of a relocation operation. Consequently, issues arising in connection with the partial migration of files are becoming the subject of much current research and development. Thus, in current systems where the file server performs re-location operation(s) in connection with a file that is partially stored in remote storage, a common approach does not exist to relocate, move or copy files from one volume to another.

Thus, assuming a file management system that can describe, define or specify when a file has been partially stored in remote storage, it would be advantageous to update such description, definition or specification to reflect efficient relocation operations. Alternatively stated, assuming the existence of a file server for a computer system capable of identifying and specifying via metadata when a file has portion(s) that have been migrated to remote storage, it would be advantageous to perform efficient relocation operations and to update the metadata in accordance with the same. It would be further advantageous to be able to move a stream/file independent of its on-disk allocations. It would be further advantageous to move metadata used to manage a partially migrated file to a new location. It would be still further advantageous to allow efficient access to migrated data of a partially migrated file relocated to a new storage location. It would be still further advantageous to provide a HSM system capable of efficiently moving, copying or relocating files that have been partially migrated to remote storage from one volume to another, even where multiple back end servers are involved.

SUMMARY OF THE INVENTION

The present invention relates to hierarchical storage management (HSM) systems used in connection with computer systems. A technique is provided whereby a file having portion(s) migrated to remote storage location(s) may be efficiently relocated, and metadata for the file is updated according to its relocated storage relationships. Thus, when a source file having portions migrated to remote storage is to be re-located or copied by the HSM system to a target file, instead of copying the entire file across all of its associated storage locations, the minimum or efficient set of data is relocated. The metadata describing the source file's migration storage characteristics is updated to reflect its new use in connection with the target file.

Other features of the present invention are described below.

BRIEF DESCRIPTION OF THE DRAWINGS

The system and methods for relocating files/streams that are partially migrated to remote storage are further described with reference to the accompanying drawings in which.

DETAILED DESCRIPTION OF PREFERRED EMBODIMENTS

The present invention has been developed in contemplation of the efficient integration of partial migration relocation capabilities and HSM systems that support partial migration techniques. In particular, the present invention has been developed to efficiently perform file re-location operations where a source file has been partially migrated from one storage location to other storage location(s).

Once file data is partially moved to remote storage due to an HSM system that accommodates partial migration techniques, a client may choose to relocate, e.g. move or copy, the file within its current volume or from one volume to another. A copy operation generally refers to the mirroring of, or making a copy of, data associated with a source file in a source location to a new file in a destination location. A move operation generally refers to the action of relocating the file while retaining its name, and as a result, the file can become the member of or become associated with a different directory and/or a different volume. In addition, a move operation may be considered two separate processes: a copying of data to a destination volume and a deletion of data from the source volume. Inter-volume relocation operations involve source and target volumes, which may be managed by separate file managers possibly located on separate servers or machines.

In consideration of the efforts pertaining to partial migration taking place with current HSM systems, the present invention assumes a flexible architecture for partially migrating some portion(s) of a file and retaining other portion(s) of the file. For example, the invention assumes the ability to partially migrate files away from on-line storage to remote storage, such as sequential access media (SAM), in connection with append-only, specified 'region of updates,' last block write only files and/or other types of files suited to partial migration. It also assumes a mechanism exists for defining and generating metadata for a partially migrated file, whereby the metadata specifies the storage relationships for partially migrated files. This metadata may be used by the HSM system to recognize the existence and nature of a partially migrated file and to efficiently perform and manage storage and access operations in connection with the partially migrated file. This metadata may be encoded, for example, in DCOM, Java, in an extensible header, XML format and the like. The present invention has thus been developed in the context of HSM systems that support the partial migration of data streams.

The present invention thus relates to hierarchical storage management systems used in connection with computer systems. When a partially migrated file is to be relocated, moved or copied by the HSM system, instead of copying the entire file across all of its storage locations, an efficient set of data may be relocated, even when multiple server computers are used incident to the relocation operation.

Figure 1:
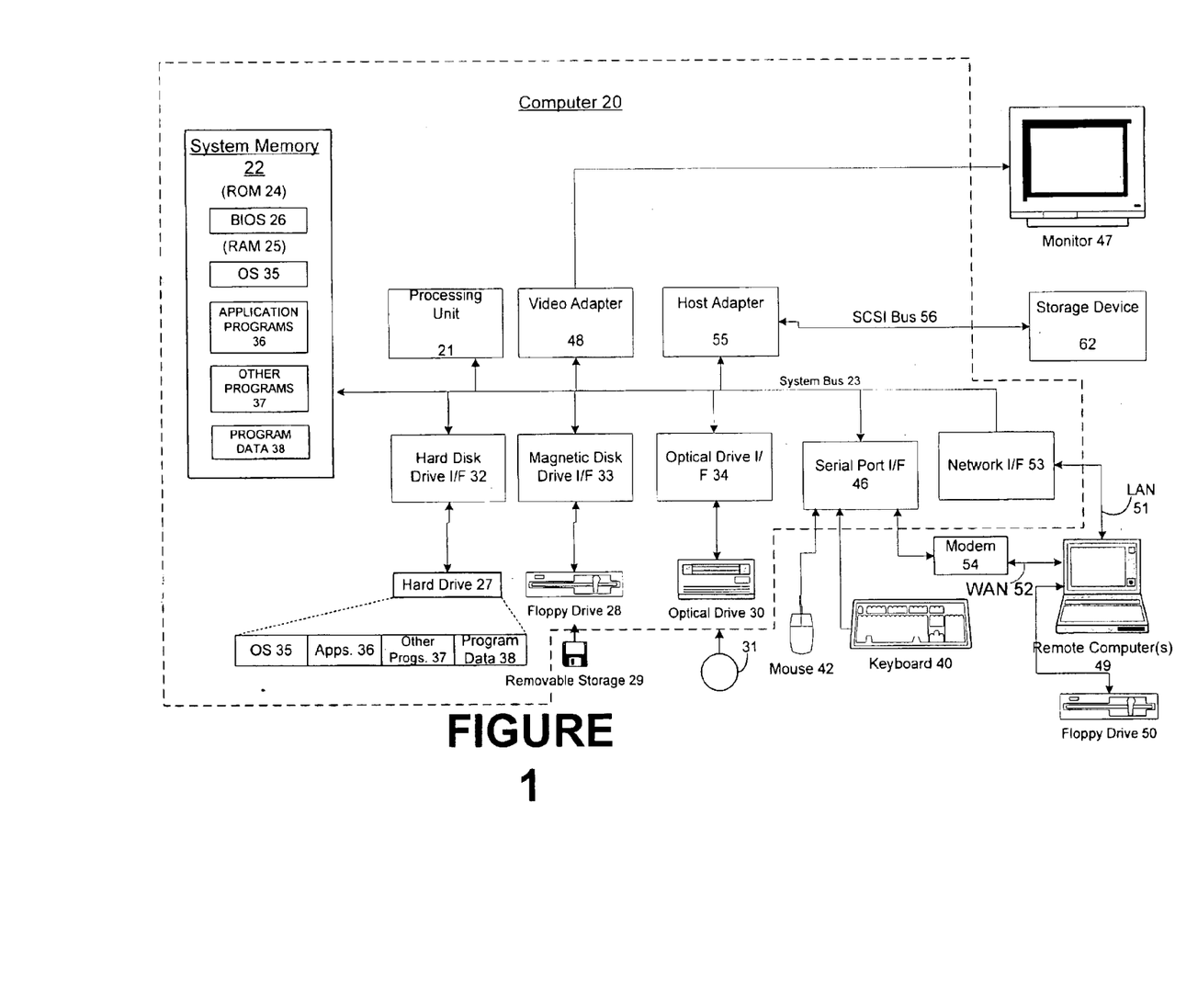
FIG. 1 is a block diagram representing a general purpose computer in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media: The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner, or the like. These and other input devices are often connected to the processing unit 21 through a serial port interface 46 that is coupled to the system bus, but may be connected by other interfaces, such as a parallel port, game port, or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
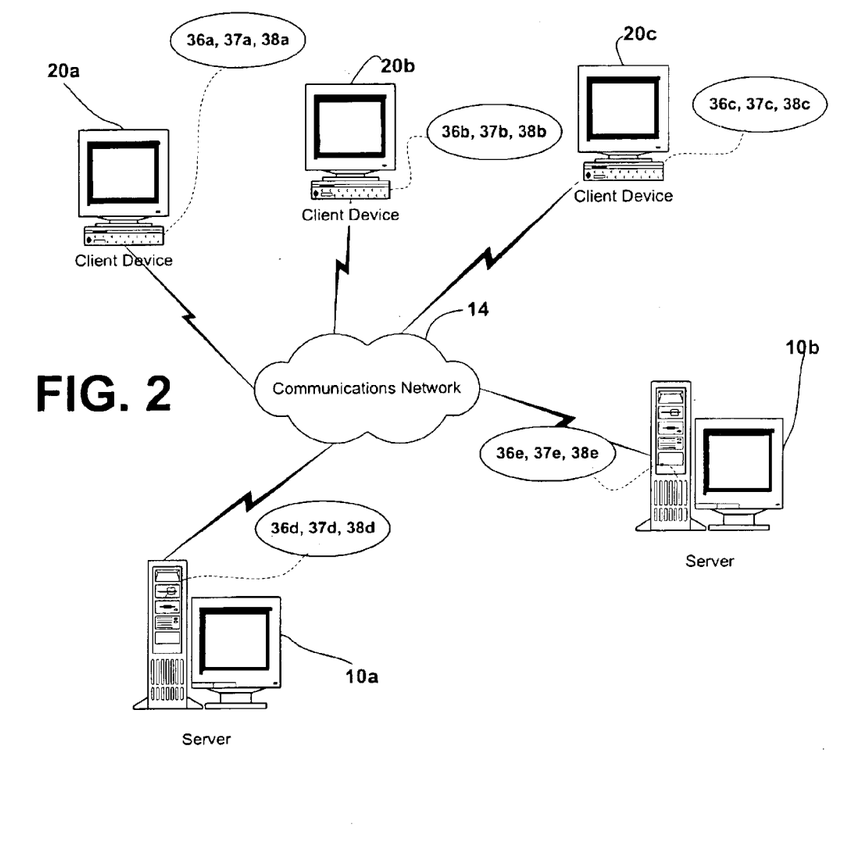
FIG. 2 is a block diagram representing an exemplary network environment in which the methods and system of the present invention may be implemented.

It should be noted that the computer described above can be deployed as part of a computer network, and that the present invention pertains to any computer system having any number of memory or storage units, and any number of applications and processes occurring across any number of volumes. Thus, the present invention may apply to both server computers and client computers deployed in a network environment, having remote or local storage. FIG. 2 illustrates an exemplary network environment, with a server in communication with client computers via a network, in which the present invention may be employed. As shown, a number of servers 10a, 10b, etc., are interconnected via a communications network 14 (which may be a LAN, WAN, intranet or the Internet) with a number of client computers 20a, 20b, 20c, etc. In a network environment in which the communications network 14 is the Internet, for example, the servers 10 can be Web servers with which the clients 20 communicate via any of a number of known protocols such as hypertext transfer protocol (HTTP).

Each client computer 20 and server computer 10 may be equipped with various application program modules 36, other program modules 37 and program data 38, and with connections or access to various types of storage elements or objects, across which files may be stored or to which portion(s) of files may be migrated.

Thus, the present invention can be utilized in a computer network environment having client computers for accessing and interacting with the network and a server computer for interacting with client computers. In accordance with the present invention, improved file server techniques are used in connection with relocation of partially migrated files and with communications and updating of file migration metadata among HSM systems. These communications and techniques can be implemented with a variety of network or system architectures, and thus should not be limited to any particular format In one aspect, the present invention provides a method of transferring on-line disk allocations for a file that has been partially migrated to remote storage within the same volume or from one volume to another, while maintaining relationships regarding the extent allocations for the file that have been previously stored in remote storage. The present invention advantageously preserves the relationships between the file's on-disk allocations and the storage allocations in remote storage during the move operation. In addition, the present invention provides a method of moving the extents that belong to a file from one server to another server.

Also, it should be noted that the act of moving a file is a special case of copying a file wherein deletion of the source file occurs. So, any description relating to move operations will also relate to copy operations, or vice versa. Additionally, acts associated with a myriad of operations (e.g., any operation that utilizes the WIN32 API call CopyFile, MoveFile or others) are also implicated by the present invention.

The methods of the present invention may be used to move a partially migrated file within a volume, between volumes managed by a single HSM system or between volumes managed by separate HSM systems. This can be accomplished e.g., using standard WIN32 API calls such as MoveFile, MoveFileEx, etc.

A straightforward manner to move a file between volumes is to first read all of the data and then use the data to create the target file. Since migrated data can take considerable time to read, however, any efficiency increases are valuable. Thus, if a move between volumes is such that the file remains in the same machine, the system data (or metadata) used by the manager of partially migrated files must be updated only to reflect the new file pathname. For some files systems, no changes will be required in connection with the data that is in remote storage. In other systems, a file may be registered for migration service with the HSM system servicing the target volume after the relocation operation. Thus, the high-level commands for moving files can be modified to recognize that a file may be partially migrated and to transfer the on-disk local state, so that substantial time and resource savings can be achieved.

As mentioned, the present invention assumes a mechanism for migrating files and for defining metadata for a partially migrated file, whereby the metadata specifies the storage relationships for the partially migrated file. This metadata may be used by the HSM system to recognize the existence and nature of a partially migrated file and to efficiently perform operations in connection with the partially migrated file. This metadata may be encoded, for example, in DCOM, Java, in an extensible header, XML format and the like. Preferably, the format is such that it may be incorporated into various World Wide Web components.

While not intended to be limiting, an exemplary metadata description may include an identification of the remote storage service utilized in connection with migrated data, a description of the ranges of storage blocks that are migrated, and any other information that may be relevant such as the time of the last migration. For instance, the metadata for a data stream at an atomic point in time may include the ID of the remote storage service used in connection with the migration of data. The metadata for the stream may also include a description of the ranges of storage blocks that are migrated. The unit used for range description, e.g., could be the allocation unit. For a file having four storage blocks migrated to remote storage, the range list might be:

M1: $<0, m_1>$

M2: $<m_1+1, m_2>$

M3: $<m_2+1, m_3>$

M4: $<m_3+1, M_4>$

Along with knowledge of the file service for the remote storage blocks, knowledge of these ranges enables the HSM system to access the all of the file's data including the data stored in the remote storage blocks. Furthermore, the metadata may include temporal information describing, for example, when the last migration took place or when a current migration is taking place. In the present invention, this metadata is updated or moved between servers when a relocation operation is performed on a partially migrated file.

Figure 3:
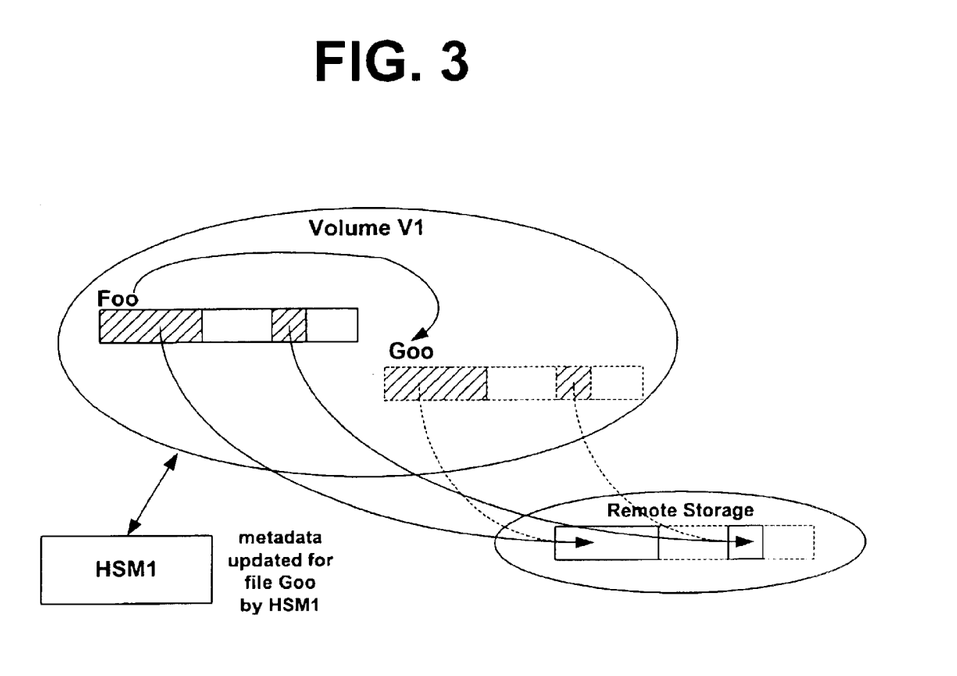
FIGS. 3 and 4 are diagrams illustrating the present invention in circumstances wherein a file Foo with partially migrated data is relocated to another file Goo within the same volume.
Figure 4:
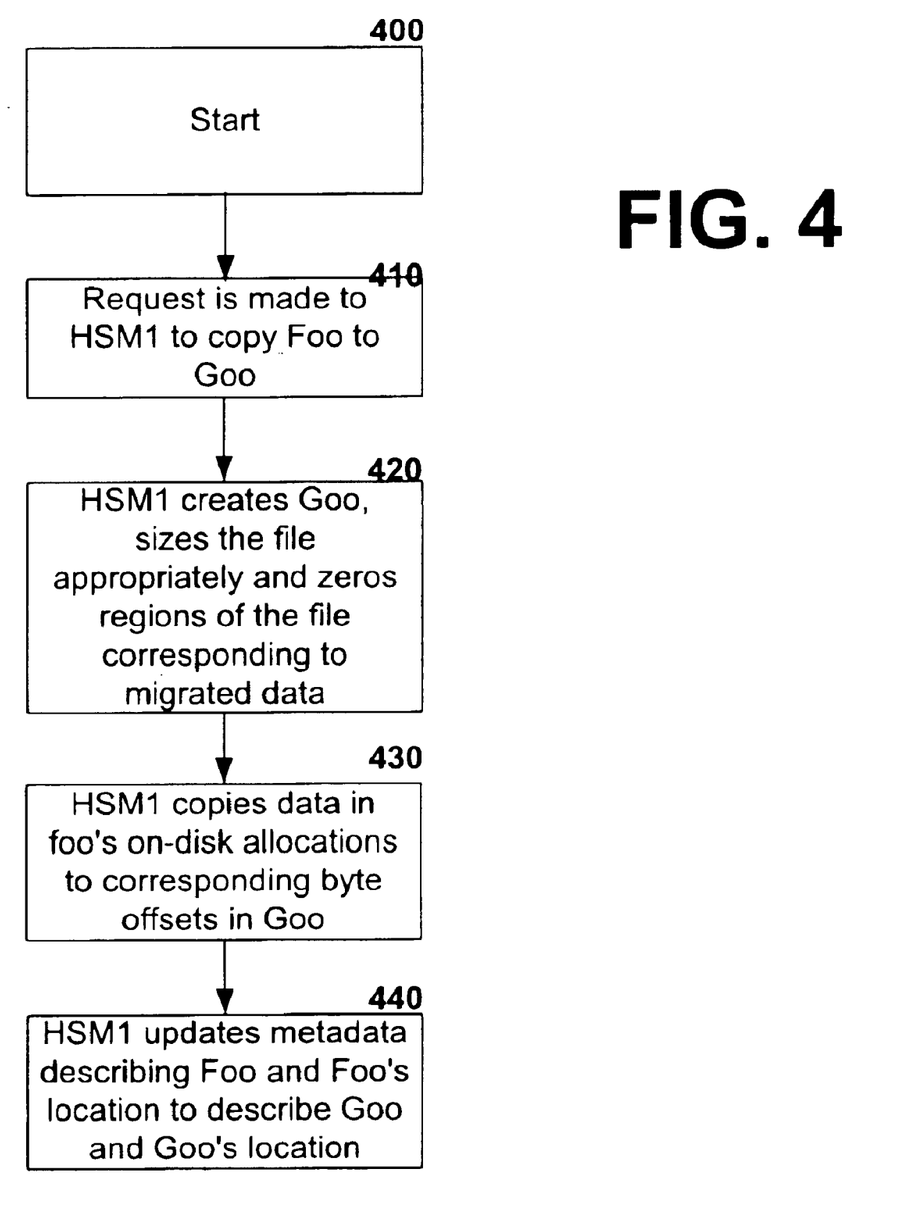

FIGS. 3 and 4 are diagrams applicable to the circumstances wherein a partially migrated file Foo is to be copied to a file Goo within the same volume V1. As mentioned, it is assumed that a flexible architecture exists for specifying Foo metadata pertaining to the portions or extents stored remotely. In the block diagram of FIG. 3, the shaded portions of Foo have been migrated to remote storage, and the unshaded portions remain stored locally in Volume V1. HSM1, used incident to file serving operations, services volume V1. The metadata that describes Foo's remote storage migration characteristics is updated for use in connection with file Goo.

According to the present invention, moving files within a volume for some file systems includes updating metadata and generating new on-disk allocations for the new file, which can be accomplished without regard to data that has been migrated to remote storage. For instance, the portion of the metadata relating to the name of the file may be changed and/or the migration metadata is updated to describe the newly named file's relationship to the migrated data.

For some file systems, an intra-volume move operation may not include moving on-disk allocations. Instead, the metadata for the file is changed or updated to describe a new location within the directory structure of the volume and thus such an intra-volume move operation is more akin to a 'pathname change.' Such a file system with an HSM system that supports partial migration of files to remote storage can be modified to implement efficient relocation of partially migrated files. According to the present invention, for such a file system, a 'pathname change' operation may be effected to carry out an intra-volume move operation whereby the on-disk allocations for the file remain intact and the metadata that describes the partial migration characteristics of the file is updated to describe the new file pathname.

For file systems wherein an intra-volume 'pathname change' will nonetheless implicate the alteration of on-disk allocations, an intra-volume move operation according to the present invention generates the appropriate new on-disk allocations for the new file. In a presently preferred implementation of the present invention, files that are partially migrated are sparse files.

FIG. 4 is an exemplary flow diagram for system communications relating to a request for copying or otherwise relocating a file Foo to a file Goo. When the source (Foo) and the target (Goo) are located on the same volume, the system may proceed as follows. After start 400, a request is made to HSM1 to copy (or other like operation) Foo to Goo at 410. At 420, the HSM system HSM1 creates Goo, sizes the file appropriately and zeros regions of the file corresponding to migrated data. At 430, HSM1 copies the data in Foo's ondisk allocations to corresponding byte offsets in Goo. At 440, HSM1 updates the metadata formerly describing Foo and Foo's location to describe Goo and Goo's location. This, for example, may involve updating a list of memory mappings or changing the file name reflected by the metadata. In this fashion, resource intensive copying of the data stored remotely is avoided, and file Foo's migration metadata is updated and becomes file Goo's migration metadata. The metadata may be stored in the server of the source file or in a separate server. Thus, updating of the metadata at 440 may include communications with the server having the metadata.

Figure 5:
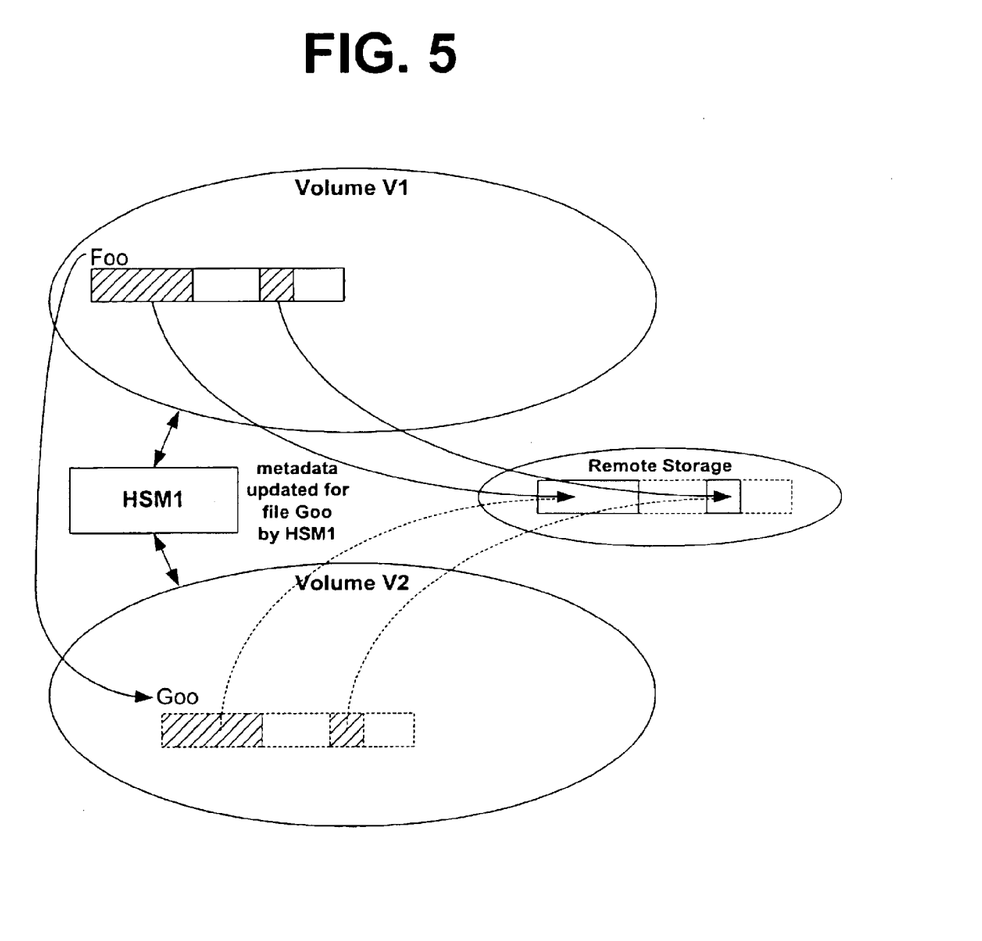
FIGS. 5 and 6 are diagrams illustrating the present invention in circumstances wherein a file Foo with partially migrated data is relocated to another file Goo from a first volume to a second volume wherein both volumes are serviced by the same HSM system.
Figure 6:
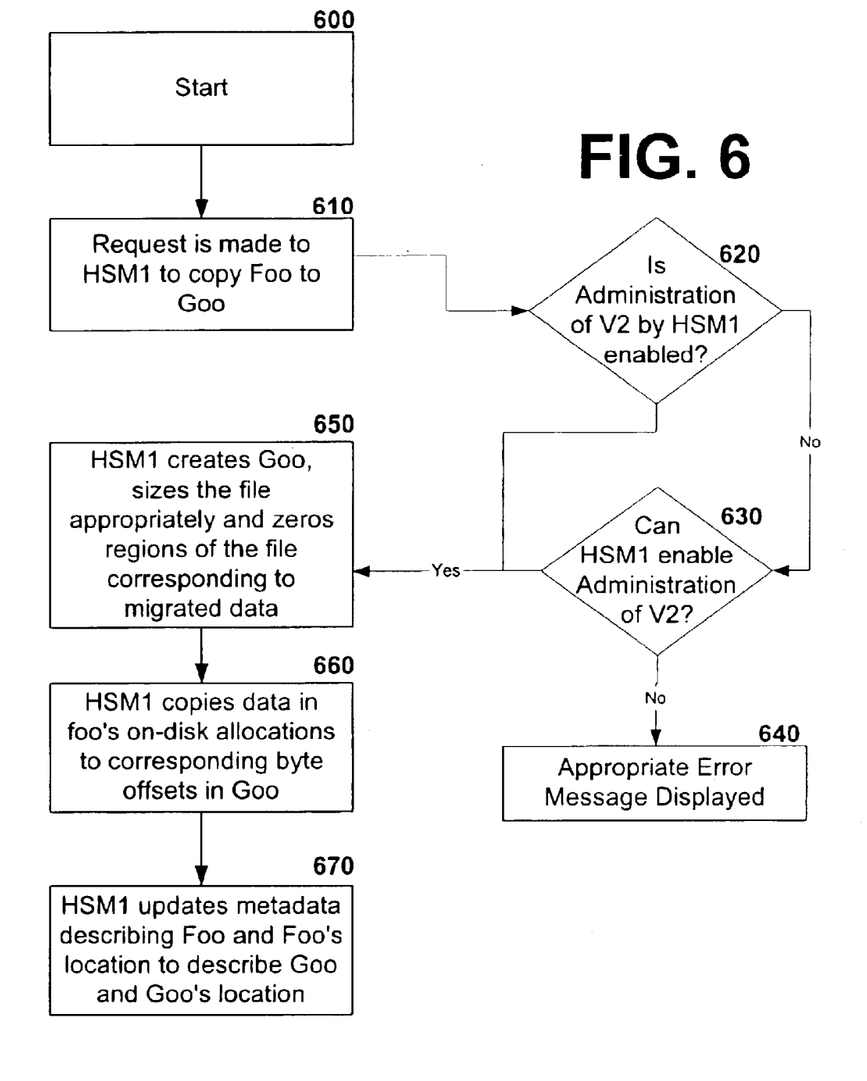

FIGS. 5 and 6 are diagrams applicable to the circumstances wherein a partially migrated file Foo on a base volume V1 is to be relocated, moved or copied to a file Goo located on or to be created on a volume V2. In the block diagram of FIG. 5, the shaded portions of Foo have been migrated to remote storage, and the unshaded portions remain stored locally in Volume V1. In this instance, the HSM system HSM1, used incident to file serving operations, services volumes V1 and V2. After the relocation of file Foo's data on. volume V1, the metadata that describes Foo's remote storage migration characteristics is updated for use in connection with file Goo and volume V2.

FIG. 6 is an exemplary flow diagram for system communications relating to a request for relocating file Foo to file Goo as shown in FIG. 5. In these circumstances, when the source (Foo) and the target (Goo) are located on the different volumes V1 and V2, the system may proceed as follows. After start 600, a request is made to relocate (or other like operation) Foo to Goo at 610. At 620, a determination is made as to whether volume V2 has been enabled for the administration of partial migration techniques. If not, at 630, HSM1 attempts to enable the administration of volume V2 for partial migration techniques. If HSM1 is unable to enable partial migration techniques for volume V2, appropriate system error messaging occurs at 640.

Also, it is noted that the acts of 620 through 640 may be operating system dependent. If the operating system (OS) has no method of securing storage for V2, administration of V2 would be enabled automatically when V2 is enabled for general partial migration techniques. If the OS provides a means of securing storage objects for V2, or securing access to the machine, then the system would be appropriately configured to allow the implementation of general partial migration techniques utilized with V2 access to the machine and/or objects of V2. However, if enabling of administration of V2 for partial migration techniques failed for any reason, appropriate system error messaging takes place.

Once it is determined that V2 is enabled for partial migration administration, HSM1 creates Goo, sizes the file appropriately and zeros the regions of the file corresponding to the migrated data at 650. Then, at 660, HSM1 relocates the data in Foo's on-disk allocations to corresponding byte offsets in Goo. At 670, HSM1 updates the metadata describing Foo and Foo's location to describe Goo and Goo's location. In this fashion, resource intensive copying of the data stored remotely is avoided and efficient relocation of the partially migrated file Foo is achieved.

Figure 7:
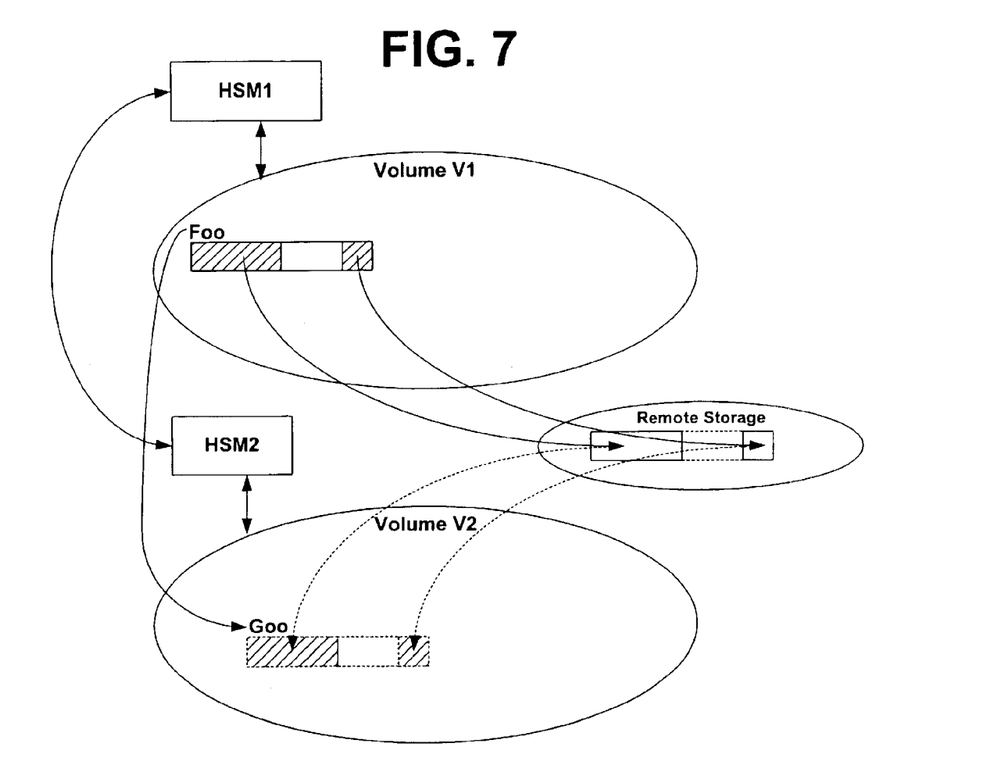
FIGS. 7 and 8 are diagrams illustrating the present invention in exemplary circumstances wherein a file Foo with partially migrated data is relocated to another file Goo from a first volume serviced by a first HSM system to a second volume serviced by a second HSM system.
Figure 8:
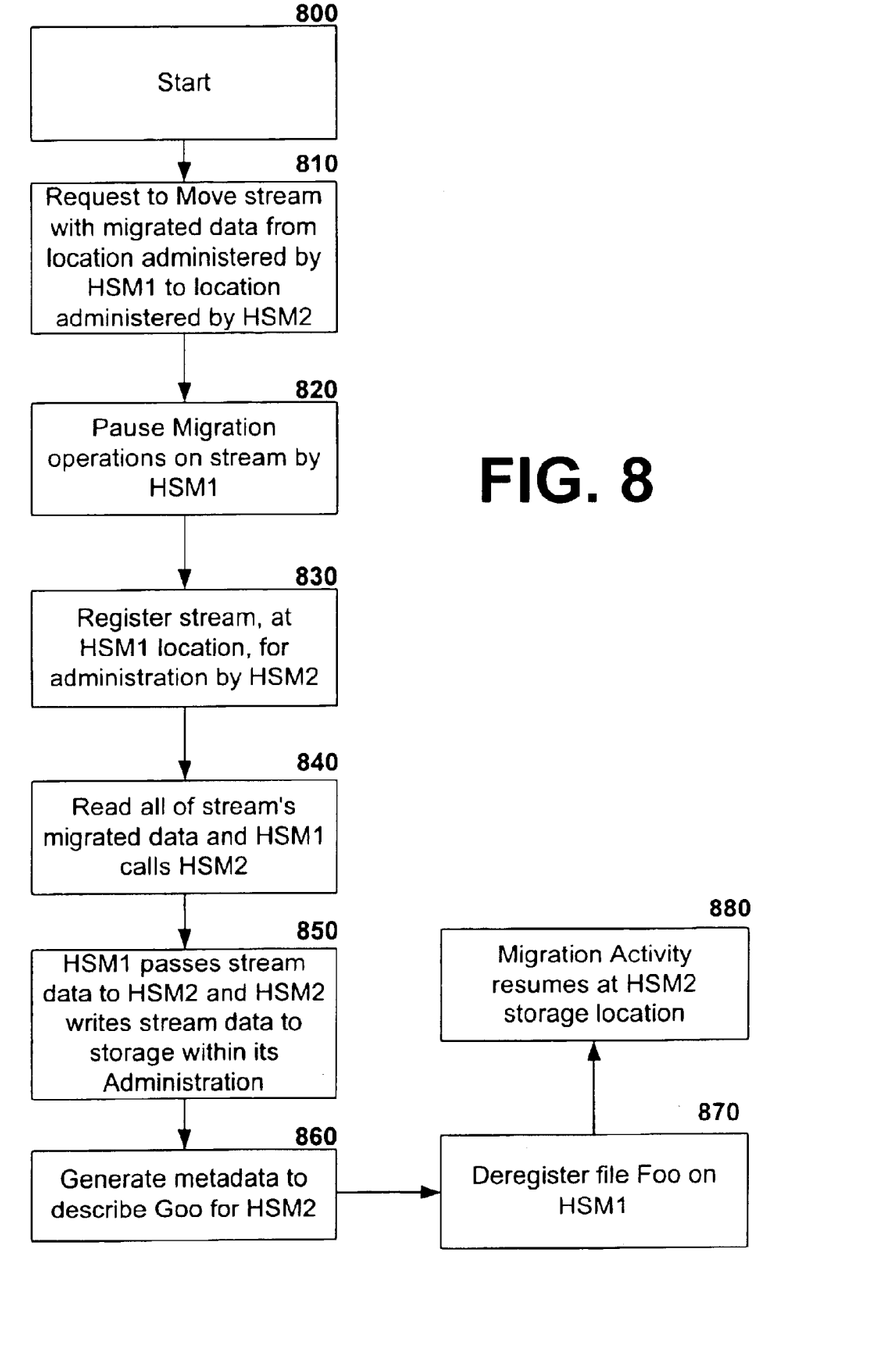

FIGS. 7 and 8 are diagrams for circumstances wherein a partially migrated file Foo with base volume V1 administered by HSM system HSM1 of a first server is to be copied to a file Goo located in or to be created in volume V2 administered by HSM system HSM2 of a second server. As such, FIGS. 7 and 8 represent an exemplary instance wherein more than one server and a plurality of storage locations are involved, but it should be understood that any number of servers with HSM systems and volumes may be supported by the techniques of the present invention. In the block diagram of FIG. 7, the shaded portions of Foo have been migrated to remote storage or another volume such as V2, and the unshaded portions remain stored locally in volume V1. HSM1 services volume V1 and HSM2 services volume V2. In accordance with the present invention, the metadata that describes Foo's storage migration characteristics is updated for use in connection with file Goo, HSM2 and volume V2.

FIG. 8 is an exemplary flow diagram for system communications relating to a request for copying or otherwise relocating file Foo to file Goo wherein multiple HSM systems are implicated. In these circumstances, the metadata associated with file Foo, understood by HSM1, is transferred to HSM2 so that the file storage relationships of Foo are preserved for Goo. After start 800, a request is made at 810 to relocate a stream of data with data migrated to remote storage, from a storage location V1 administered by HSM1 to a storage location V2 administered by HSM2. At 820, migration operations by HSM1 are paused for file Foo so that no updates to file Foo's migration characteristics occur during the relocation operation. At 830, the data stream is registered by HSM1 for relocation administration by HSM2. At 840, all of the stream's migrated data is read from remote storage, and HSM1 contacts HSM2. At 850, HSM1 passes the stream of data Foo to HSM2 and HSM2 writes the data stream to storage within its administration. At 860, metadata is generated for use by HSM2 relating to Goo's location and characteristics. At 870, file Foo is deregistered from administration by HSM1 (in the case of a move operation) and at 880, migration activity resumes for file Goo (and Foo in the case of a move operation).

The methods of the present invention may also be utilized to move a partially migrated file between back end servers. To illustrate this scenario, a file might have data in three different places (volumes, remote storage, etc.) and thus a move operation might include the possibility of moving the data between back-end servers. Move operations associated with this back-end data requires a data transfer protocol between the stores with the goal of maximizing the data rates achieved and to "bulk transfer" the metadata needed to describe this data. Thus, the metadata for describing a relocated file may be moved from one server to another server so that the metadata is located for use with the file.

Hence, the present invention efficiently implements and performs relocation operations and the like in HSM system architectures that accommodate partial migration of files to remote storage location(s). In such an HSM system, it is noted that a file registered for migration administration could exist on a first server, the HSM system implementation could exist on a second server, the metadata for use by the,HSM system for accessing the file could exist on a third server and the portion(s) of the file that have been migrated could be accessed through a fourth server. The above-described relocation operations of the present invention apply to these circumstances as well by implementing appropriate server communications. For example, when the HSM system is asked to relocate a file to another volume, metadata or a portion of the metadata is passed from the third server to the second server, so that the HSM system may have access to the file's remote storage characteristics.

Thus, the present invention efficiently implements and performs move operations and the like in HSM system architectures that accommodate partial migration of files to remote storage locations. The techniques of the present invention are applicable to multiple HSM systems and servers.

The various techniques described herein may be implemented with hardware or software, where appropriate, or with a combination of both. Thus, the methods and apparatus of the present invention, or certain aspects or portions thereof, may take the form of program code (ie., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware and other firmware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques and services used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while XML, DCOM or Java may be used as a communications protocol for metadata, it should be understood that many different communications and network protocols may be suited to the relocation of partially migrated files and the communication of file migration information in accordance with the present invention. Furthermore, it should be emphasized that a variety of computer platforms, including handheld device operating systems and other application specific operating systems are contemplated. Therefore, the present invention should not be limited to any single embodiment, but rather construed in breadth and scope in accordance with the appended claims.

What is claimed is:

1. A method of relocating a first file, having at least one portion on-disk and at least one portion migrated to remote storage, to a second file in a computer system, comprising:

allocating space for said second file corresponding to said at least one on-disk portion of said first file;

relocating said at least one on-disk portion of said first file to the corresponding space allocated for said second file; and updating metadata, previously generated for use with said first file, for use with said second file.

2. A method according to claim 1, wherein said first file and said second file are co-located on the same volume.

3. A method according to claim 1, wherein said first file and said second file are located on different volumes.

4. A method according to claim 1, wherein a first file server services a first volume having the first file, said first file with portions migrated to remote storage, and wherein said first file is relocated to a second file for storage in a second volume serviced by a second file server.

5. A method according to claim 4, wherein said metadata is passed from said first file server to said second file server for use in connection with said second file.

6. A method according to claim 1, wherein said relocating is a move operation.

7. A method according to claim 1, wherein said relocating is a copy operation.

8. A method according to claim 1, wherein said first file is deleted after said relocating.

9. A computer-readable medium having computer-executable instructions for instructing a computer to perform the method recited in claim 1.

* * * * *